Patented Oct. 15, 1929

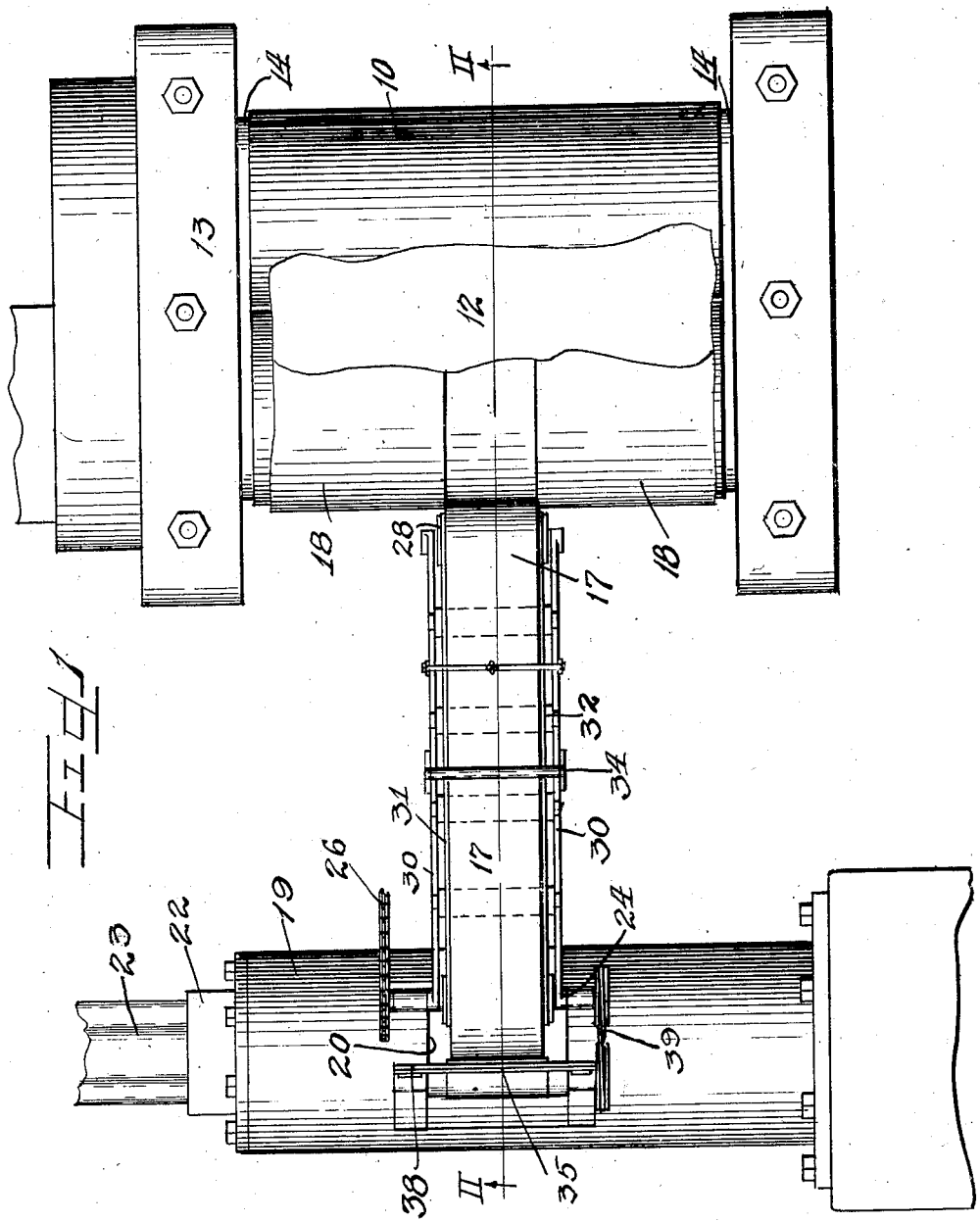

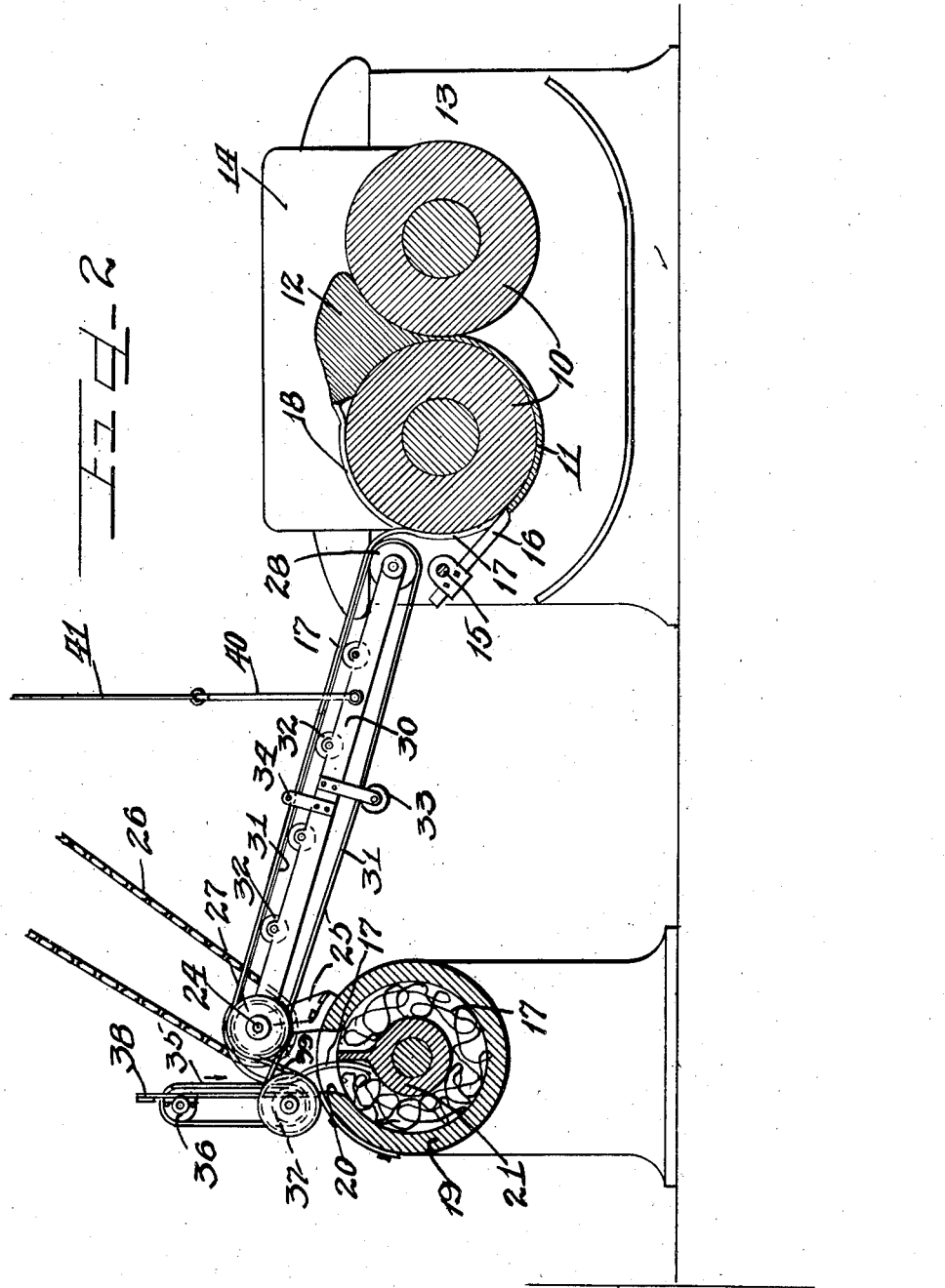

1,731,537

UNITED STATES PATENT OFFICE

ARNOLD R. KRAUSE, OF EAU CLAIRE, WISCONSIN, ASSIGNOR TO GILLETTE RUBBER COMPANY, OF EAU CLAIRE, WISCONSIN, A CORPORATION OF WISCONSIN

STOCK FEEDING AND ADJUSTING DEVICE

Application filed February 18, 1927. Serial No. 169,402.

This invention relates to a stock feeding and adjusting device for feeding sticky and hard to handle material such as rubber from one machine to another.

It is an object of this invention to provide an improved conveyor for the purpose of handling tacky material and delivering the same into a restricted opening without liability of trouble due to the material overlapping the margins of the openings and requiring a shut down to clear up the tangle. In handling a tacky and elastic material like raw rubber sheet stock on a conveyor, the end as it leaves the belt is apt to project outwardly beyond the desired point of delivery and miss the opening, overlapping and tangling up. Also if the receptacle is nearly full the continued feeding of the stock causes it to loop up over the rim and it is accordingly an object of this invention to provide means to cause downward feeding of the stock delivered from the conveyor.

It is also an object of this invention to provide an improved conveyor for feeding rubber stock from a mill to a forming or extruding machine, the conveyor being arranged to be adjustable, to be swung out of the way during the periods required for starting and mixing each batch of material on an intermittently operating mill.

Other and further important objects of this invention will be apparent from the disclosures in the drawings and specifications.

This invention (in a preferred form) is illustrated in the drawings and hereinafter more fully described.

On the drawings:

Figure 1 is a fragmentary plan view showing part of a rubber mixing mill and part of a tread stock extruding machine with the device of this invention associated therewith.

Figure 2 is a section on the line II—II of Figure 1.

As shown on the drawings:

The rubber mill shown comprises a pair of rolls 10 rotating towards each other and spaced apart slightly to produce a sheet of rubber 11 of the desired thickness, the rubber stock 12 being heaped up in the trough between the two rolls. The rolls are journaled in suitable standards 13 and side boards 14 are fitted to prevent the rubber stock from working off the ends of the rolls. A bar 15 carries a pair of knives 16 adapted to cut a narrow strip 17 from the center of the strip or sheet 11, the side pieces 18 being carried up over the roll back to the rubber stock 12 where they are remixed therewith, thus continuously producing a new sheet only the center part of which is utilized in order to obtain thoroughly mixed stock. The extruding machine comprises a casing 19 having an inlet port 20, the casing containing a screw type conveyor 21 forcing the rubber sheets towards a tread stock forming die 22 which contains an opening of the desired outline to produce a finished raw tread stock 23 in continuous lengths.

As the rubber mill can only intermittently produce the strip 11, because of the time required for working up each batch before it is mixed sufficiently, I have produced a conveyor to feed the strip into the extruding machine that can be swung up out of the way during the preliminary mixing period. The conveyor of this invention is mounted on a shaft 24 journaled in a frame 25 bolted about the port 20 in the extruding machine, the shaft being driven by a chain 26. A driving pulley 27 is mounted on this shaft and an idler or return pulley 28 is mounted at the outer end of a framework 30 pivoted to the shaft 24, an endless conveyor belt 31 running over these pulleys and being supported at intermediate points by a series of rollers 32 mounted along the framework. A supporting roller 33 is also provided beneath the framework to prevent too much sag in the return portion of the belt 31. A hold down roller 34 is provided above the feeding portion of the belt to assist the traction between the belt and the rubber strip 17 fed upwardly thereby.

As the rubber strip 17 would tend to loop out and fall outside the port 20 when starting up or if at any time the port should become partly filled, a downwardly feeding conveyor belt 35 is mounted over the pulleys 36 and 37 in a vertical frame 38, the lower pulley 37 being driven by a crossed belt 39 from the shaft 24 to produce the desired direction of belt movement.

The framework 30 pivoted on the shaft 24 may be raised out of the way or lowered into operating position by means of a bail 40 and rope 41, swinging the framework 30 up permitting ready access to the knives 16 to permit proper adjustment of the sheet of rubber and to manually handle the cut strip 17 when the mixing has been completed.

I am aware that many changes may be made and numerous details of construction may be varied through a wide range without departing from the principles of this invention and I, therefore, do not purpose limiting the patent granted hereon, otherwise than necessitated by the prior art.

I claim as my invention:

1. In combination, a mill for forming sheet material, an extruding machine associated with said mill, a conveyor for delivering sheet material to said machine from said mill, and guide means comprising an endless belt positioned adjacent the discharge end of said conveyor and in the path of the sheet leaving the conveyor for altering the direction of movement of the sheet on the conveyor so as to prevent said sheet from overrunning the inlet of the machine, whereby the material is discharged directly into said inlet.

2. In combination, a forming machine adapted to receive plastic sheet material, a conveyor for delivering sheet material to said machine, and guide means positioned adjacent the discharge end of said conveyor and in the path of the sheet leaving the conveyor for altering the direction of movement of the sheet on the conveyor so as to prevent said sheet from overrunning the inlet of the machine, whereby the sheet is discharged directly into said inlet, said guide means comprising a substantially vertical endless belt having its side adjacent the discharge end of the conveyor substantially aligned with the inlet of said machine.

3. In combination, a mill for forming sheet material, an extruding machine associated with said mill, a conveyor for delivering sheet material to said machine from said mill, guide means positioned adjacent the discharge end of said conveyor and in the path of the sheet leaving the conveyor for altering the direction of movement of the sheet on the conveyor so as to prevent said sheet from overrunning the inlet of the machine, whereby the material is discharged directly into said inlet, and a pivotal mounting for the machine end of said conveyor for enabling said conveyor to be moved upwardly away from and clear of said mill when said machine is not in use.

In testimony whereof I have hereunto subscribed my name.

ARNOLD R. KRAUSE.